Figure 1:
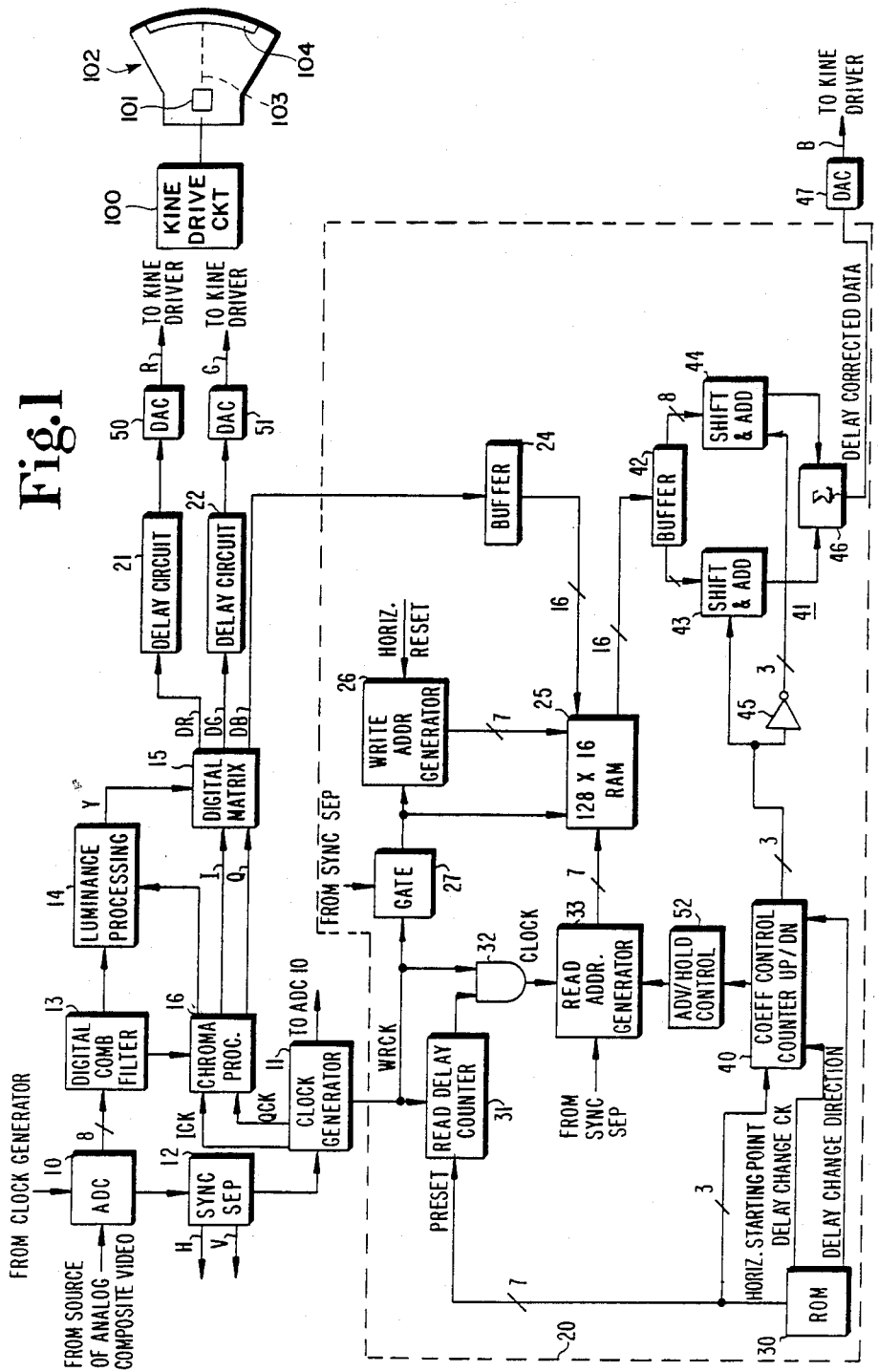

United States Patent [19]

Bolger

[11] Patent Number: 4,771,334

[45] Date of Patent: Sep. 13, 1988

[54] DIGITAL VIDEO DELAY BY SAMPLE INTERPOLATION

[75] Inventor: Thomas V. Bolger, Merchantville, N.J.

[73] Assignee: RCA Licensing Corporation, Princeton, N.J.

[21] Appl. No.: 35,218

[22] Filed: Apr. 7, 1987

Related U.S. Application Data

[63] Continuation of Ser. No. 645,984, Aug. 31, 1984, abandoned.

[51] Int. Cl.[4] .......................... H04N 5/68; H04N 9/16
[52] U.S. Cl. ...................................... 358/242; 358/64; 358/67; 358/179
[58] Field of Search ................. 358/179, 242, 243, 64, 358/65, 73, 74, 67

[56] References Cited

U.S. PATENT DOCUMENTS

| | | | |
|---|---|---|---|
| 2,764,628 | 9/1956 | Bambara | 358/65 |
| 3,733,507 | 5/1973 | Cassett et al. | 313/70 |
| 3,893,174 | 7/1975 | Sano et al. | 358/65 |
| 3,975,766 | 8/1976 | Sano et al. | 358/65 |
| 4,034,324 | 7/1977 | Sano et al. | 335/212 |
| 4,127,873 | 11/1978 | Katagi | 358/242 |
| 4,282,546 | 8/1981 | Reitmeier | 358/22 |
| 4,381,547 | 4/1983 | Ejiri | 382/47 |
| 4,600,945 | 7/1986 | Bolger | 358/160 |

FOREIGN PATENT DOCUMENTS 2137849 10/1984 United Kingdom.

OTHER PUBLICATIONS

"Digital System for Horizontal Geometry and Convergency Correction", from Digest Article for ICCE 84.
"Digital System for Horizontal Geometry and Convergence Correction", from IEEE Transactions on Consumer Electronics, vol., CE–30, No. 3, Aug. 1984.
Deubert, R., "Digital System for Horizontal Geometry and Convergence Correction", IEEE Transactions on Consumer Electronics, vol. CE–30, No. 3, Aug. 1984.

Primary Examiner—Tommy P. Chin
Attorney, Agent, or Firm—Eugene M. Whitacre; Joseph J. Laks; Sammy S. Henig

[57] ABSTRACT

A video display apparatus convergence and correction arrangement includes a digital signal delay circuit which uses a sample interpolation technique to provide apparent signal delays corresponding to fractional parts of whole sample periods. Adjacent digital samples are combined using fractional coefficients that sum to unity. The selection of the fractional coefficients determines the size of the smallest delay increment. The number of whole sample delay periods as well as the initial fractional coefficients for a given horizontal scan line are provided by information that is stored in a memory device during assembly or alignment of the video display apparatus.

7 Claims, 2 Drawing Sheets

DIGITAL VIDEO DELAY BY SAMPLE INTERPOLATION

This is a continuation of application Ser. No. 645,984, filed 8/31/84, now abandoned.

This invention relates to digital processing of video signals and, in particular, to the delay of video signals to eliminate raster distortion and convergence errors.

A digital color television system samples an analog video signal at a predetermined rate, for example, 14.32 MHz, which, for NTSC color signals, is four times the color subcarrier frequency. The signal amplitude of each sample is converted to a digital value by an analog-to-digital converter (ADC). The digitized video signal is processed to form red, green and blue drive signals which, after conversion back to the analog domain by a digital-to-analog converter (DAC), are applied to the cathodes of the color cathode ray tube.

Both digital and analog television receivers are subject to raster distortion and convergence errors. Horizontal convergence errors and raster distortion, such as side pincushion distortion, may be corrected by selectively delaying one or more of the individual color signals in a given horizontal scan line in order to converge the three colors on the cathode ray tube display screen. In a digital system, this delay may be accomplished by clocking the digital samples into a storage device, such as a random access memory (RAM) and clocking the samples out of the RAM after a predetermined number of clock pulses. This technique permits video information and, consequently, entire video lines, to be moved in steps equal to the distance between adjacent digital samples, or pixels, on the cathode ray tube display screen.

Actual convergence and distortion errors may require that the video information be moved a fraction of a whole sample to provide correction within a specified tolerance. U.S. Pat. No. 4,600,945, issued July 5, 1986, in the name of T. V. Bolger and entitled, "Digital Video Processing System with Raster Distortion Correction", describes a digital television system having a multiphase clock for reading samples out of a digital sample storage device. The phase of the clock is selected to provide the amount of sample delay necessary to give the desired raster distortion or convergence correction for each of the three colors.

The present invention provides a digital television system which utilizes a fixed frequency and single phase clock, yet provides fractional sample delays in order to correct distortions within closely defined tolerances.

In accordance with the present invention, a variable delay apparatus for a line of digitally encoded component video signal information comprises a circuit for selecting a first one of a plurality of digital samples from a line of digitally encoded video signal information, the sample having an encoded amplitude value of one of a plurality of possible values.

A circuit processes the first sample to provide a first processed sample having an amplitude value comprising a first fraction of the first sample amplitude value.

Circuitry selects a second digital sample located adjacent to the first sample.

Elements process the second sample to provide a second processed sample having an amplitude value comprising a second fraction of the amplitude value of the second sample. The second fraction is a unity fractional complement of the first fraction.

A circuit combines the first and second processed samples to form a third sample having an apparent displacement from the first sample.

Figure 2:
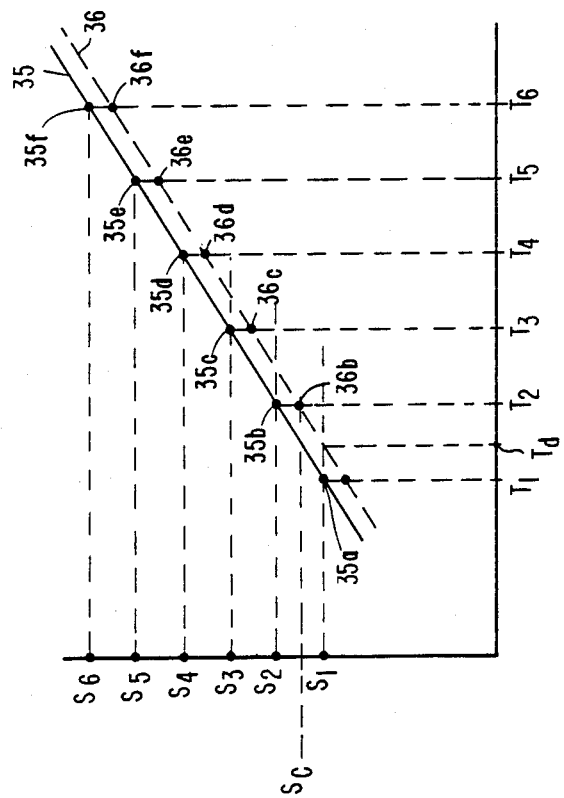

In the accompanying drawing;

FIG. 1 is a schematic diagram of a digital signal processing circuit in accordance with an aspect of the present invention; and FIG. 2 illustrates waveforms useful in understanding the theory of operation of the circuit of FIG. 1.

Referring to FIG. 1, an analog composite video signal, from a source of video signals (not shown), is applied to an analog-to-digital converter (ADC) 10. ADC 10 generates digital signals at a sample rate determined by the clock signal frequency from a clock generator 11. The circuit of FIG. 1 illustratively uses a sampling frequency equal to four times the color subcarrier frequency of 3.58 MHz, for NTSC color signals, equal to a sampling frequency of 14.32 MHz. ADC 10 is illustratively shown as providing an 8-bit digital sample, thereby generating samples having $2^8 = 256$ quantizing steps. The digitized video signal is applied to a synchronizing separator circuit 12, where it is processed to remove the horizontal and vertical synchronizing information, and to a digital comb filter 13. Digital comb filter 13 separates the luminance and chrominance information and apples the luminance information to luminance processing circuitry 14 which provides a luminance signal on a conductor designated Y to a digital matrix 15. Chrominance information from digital comb filter 13 is applied to chrominance processing circuitry 16, which generates the I and Q color signals in response to the properly phased I and Q clock signals, on conductors designated ICK and QCK, from clock generator 11. The I and Q color signals, on conductors I and Q, are also applied to digital matrix 15, which combines the luminance signal and the I and Q color signals to produce the digital red, green and blue color signals on conductors DR, DG and DB, respectively.

Each of the digital red, green and blue color signals is applied to a digital delay circuit. FIG. 1 shows, in detail, a digital delay circuit 20 which acts on the digital blue color signal via conductor DB. Similar delay circuits 21 and 22 for the digital red and green color signals are illustrated in block diagram form, for simplicity.

Digital matrix 15 generates digital color signal samples illustratively comprising 8 bits. These samples are applied to a buffer 24 via the digital blue signal conductor DB which produces a 16-bit sample pair comprising two adjacent 8-bit color signals samples. For example, subsequent sample pairs in a given horizontal scan line may comprise digital samples one and two, samples two and three, and samples three and four, such that each subsequent sample pair comprises one new 8-bit sample not included in the previous sample pair. The 16-bit sample pairs are stored in a random access memory (RAM) 25 in locations determined by a write address generator 26. Write address generator 26 is incremented by a write clock signal provided by clock generator 11 via conductor WRCK. The write clock signal is first applied to a gate circuit 27 which prevents the write clock signal from being applied to the write address generator 26 during the horizontal blanking interval. Gate circuit 27 operates in response to a signal from synchronizing pulse separator circuit 12. Write address generator 26 is reset each horizontal scan line by a horizontal reset pulse that may also be generated by synchronizing pulse separator 12.

A delay of the blue video signal is accomplished by writing a predetermined number of sample pairs into RAM 25 before any reading of sample pairs out of RAM 25 is begun. Sample pairs are written into RAM 25 at the write clock rate, i.e., 14.32 MHz, which corresponds to one sample pair being written into RAM 25 approximately every 70 nanoseconds. Each sample pair written into RAM 25 before sample pairs are read out of RAM 25 corresponds therefore to a delay of 70 nanoseconds. RAM 25, configured to accommodate 128 sample pairs, could therefore produce a maximum delay of 128 samples $\times$ 70 nanoseconds/sample = 8.96 $\mu$S. In order to provide horizontal movement of the digital red, green and blue color signals in either direction with respect to each other, a nominal delay is provided for each of the digital color signals on each horizontal scan line. The amount of actual delay desired for each of the color signals can then be provided by increasing or decreasing the delay relative to the nominal delay. For delay circuit 20 of FIG. 1, a nominal delay of 4.48 $\mu$S, corresponding to 64 samples $\times$ 70 nS/sample, gives the maximum amount of relative sample movement that can be produced by RAM 25. For example, if the digital green color signal is processed by delay circuit 22 to have the nominal delay of 4.48 $\mu$S, the blue color signal, processed by delay circuit 20, may be delayed with respect to the green signal by a maximum of 4.48 $\mu$S, or the blue signal may be advanced with respect to the green signal by a maximum of 4.48 $\mu$S. The amount of the delay is determined by the time at which samples are read from RAM 25 relative to the time at which those samples were written into RAM 25.

The units of signal delay that have been discussed up to this point have been determined by whole numbers of clock pulses, i.e., 70 nanosecond steps. In actual operation, however, the amount of convergence or raster distortion requiring correction may not correspond to whole numbers of delay steps, but may require a fraction of a delay step in order to bring the convergence or distortion errors within desired tolerances or specifications.

Delay circuits 20, 21 and 22 incorporate means providing fractional amounts of whole delay steps in order to accurately correct convergence and raster distortion errors. In accordance with an aspect of the present invention, the fractional delay steps are achieved via sample interpolation circuitry which operates in the following manner.

The convergence errors and amounts of raster distortion (side pincushion distortion, for example) for a given video display apparatus are determined during assembly of the video display apparatus. One technique for determining this error utilizes photodiodes placed at various screen locations to sense actual electron beam landing positions. Knowing the desired beam landing positions in order to produce a raster without misconvergence or distortion errors allows a determination of the amount of shift needed in the beam landing positions in order to accomplish the desired corrections. This shift information is utilized to program a read-only-memory (ROM) 30 during assembly or alignment of the video display apparatus. The ROM 30, which illustratively includes misconvergence and distortion information for each digital sample of each horizontal scan line, is individually programmed for a particular cathode ray tube of a particular video display apparatus.

For a given horizontal scan line, the amount of blue signal delay needed (nominal delay plus or minus delay shift) to effect the desired corrections is provided by ROM 30 to a read display counter 31 via a conductor identified as PRESET. Read delay counter 31 is incremented by the write clock signal and begins to produce output pulses in response to write clock pulses when the number of preset sample delay steps from ROM 30 is reached. The output pulses from read delay counter 31 are applied to the input of an AND gate 32. Another input of AND gate 32 is coupled to the input of gate 27, which is the write clock pulses. AND gate 32 will therefore produce output pulses representative of write clock pulses whenever the preset delay count has been exceeded. The AND gate 32 output pulses are applied to a read address generator 33, which is reset each horizontal line by a signal from sync separator 12. Read address generator 33 is coupled to RAM 25 and accesses particular sample locations of RAM 25 at the frequency of the clock pulses from AND gate 32. Samples are read out of RAM 25 from addresses accessed by read address generator 33 in the order they were written into RAM 25 from buffer 24, i.e., first in - first out. Read address generator 33 will always lag write address generator 26 so that information is always available to be read out.

As previously described, merely delaying the reading out of video samples from RAM 25 by a multiple of clock pulses may not provide accurate enough convergence or raster distortion correction. It may be necessary to have a delay equal to a fraction of the delay provided by one clock pulse delay. This fractional delay may be effected by sample interpolation, which will be explained with reference to FIG. 2. FIG. 2 illustrates a portion of an analog video waveform 35. Waveform 35 is illustratively shown as being digitally sampled, by an analog-to-digital converter, similar to ADC 10, for example, at sample points 35*a-f*. Sample interpolation combines a fraction of the digital amplitude values of adjacent samples to from a new sample having a new amplitude value. The fractions selected illustratively comprise a unity fractional complement; that is, the sum of the fractions selected for an adjacent sample pair should sum to unity.

In FIG. 2, sample points 35*a-f* occur at times $T_1$-$T_6$, respectively, and have amplitude values of $S_1$-$S_6$, respectively. As an illustration of sample interpolation, the amplitude values of adjacent samples, such as the amplitude of sample 35*a*, equal to $S_1$, and the amplitude of sample 35*b*, equal to $S_2$, are combined, for example, using ½ as the fractional coefficient for each sample. The resultant samples will have amplitude values intermediate the original sample amplitudes, as shown by sample 36*b*, having an amplitude $S_C$, between $S_1$ and $S_2$. If the resultant samples are used to replace the original samples, as shown by samples 36*b*-36*f* in FIG. 2, the effect is to generate a new encoded waveform 36 that gives the appearance of being shifted or delayed with respect to waveform 35 by an amount equal to one half a whole sample period. The fractional coefficients selected will determine the amount of delay with respect to time $T_1$. For example, using ⅝ of the amplitude $S_1$ and ⅜ of the amplitude $S_2$ will produce a delay of ⅜ the sample period from $T_1$ to $T_2$.

Similarly, if adjacent digital samples of a horizontal line of video information are combined in the previously described manner by using unity fractional complement coefficients, it is possible to shift the video information in as small an increment as desired, merely by selecting the proper fractional coefficients. A greater number of fractional parts of a selected coefficient will result in smaller possible delay steps.

In an application such as is shown in FIG. 1, the number of whole and fractional delay periods for each horizontal scan line is stored in ROM 30 to establish a horizontal starting point for the video signal information of each line. As described previously, the number of whole delay periods is applied to read delay counter 31 via the PRESET conductor, in order to determine when samples will begin to be read from RAM 25. A three-bit digital word, representative of the fractional delay coefficient, is applied to a coefficient control and counter circuit 40, which in turn applies the three-bit digital word to a sample interpolator circuit 41. Interpolator circuit 41 incorporates a buffer 42, shift and add circuits 43 and 44, inverter 45 and a summer 46. Buffer 42 reforms the 16-bit sample pair from RAM 25 into two 8-bit samples which are respectively applied to shift and add circuits 43 and 44. The three-bit word from coefficient control and counter circuit 40 is applied to shift and add circuit 43 and to inverter 45. The digital word value determines the number of digit shifts required by shift and add circuit 43. Inverter 45 forms a digital word representative of the unity fractional complement coefficient, which is applied to shift and add circuit 44 and determines the number of digit shifts. Shift and add circuits 43 and 44 perform the function of multiplying the values of samples from buffer 42 by their respective fractional coefficients. This is accomplished by shifting the appropriate number of bits of the digital samples based on the coefficient representative 3-bit words. Shifting bits therefore allows 8-bit digital samples to be moved in delay increments equal to $\frac{1}{8}$ of the total sample period. Therefore, delay increments of 8.75 nsec are possible. The outputs from shift and add circuits 43 and 44 are combined by summer 46 to form the resultant delay corrected video information sample. The output signal from summer 46 comprising delay corrected digital data occurring at the 14.32 MHz sample rate, is applied to a digital-to-analog (DAC) converter 47, which converts the digital data to the analog blue drive signal. The blue drive signal is then applied to the kinescope or cathode ray tube drive circuits which act to produce the desired blue-designated electron beam. Similarly, the outputs of delay circuits 21 and 22 are applied to digital-to-analog converters 50 and 51, respectively, which produce the red and green drive signals. The drive signals from digital-to-analog convertors 47, 50 and 51 are applied to kine drive circuitry 100 which enables the electron gun assembly 101 of a cathode ray tube 102. Electron gun assembly 101 produces red, green and blue-designated electron beams 103 which impinge on the phosphor display screen 104 of cathode ray tube 102.

The previously described interpolation method, utilizing a single fractional coefficient pair, will provide the same amount of delay for each sample of a given horizontal scan line. This is appropriate for certain types of correction, such as raster centering; however, other types of misconvergence or distortion errors will require different amounts of correction, or sample delay, for different positions along a given horizontal scan line. For example, misconvergence is usually more severe at the ends of a horizontal line than at the center of the line. Similarly, side pincushion distortion will decrease in severity away from the edges of the cathode ray tube display screen. This requires a variable amount of sample delay for a given horizontal scan line. Since the amount of delay change from sample to sample is relatively small, it is possible to accomplish the desired variable delay by changing the fractional coefficients.

The rate of delay change (the number of digital samples occurring between coefficient changes), and the delay change direction (whether the delay is increased or decreased) are also programmed into ROM 30 as a result of the error measurements taken during circuit assembly and alignment. The coefficient change and delay change direction data is applied to coefficient control and counter circuit 40. This delay change data either increments or decrements the coefficient counter, which in turn controls the operation of interpolator 41. When the coefficient counter of coefficient control and counter circuit 40 becomes incremented or decremented to its upper or lower limit, respectively, an output signal is applied to advance/hold control circuit 52. When the coefficient counter becomes incremented to its upper limit, advance/hold control circuit 52 increments read address generator 33 by one sample address. This is in addition to the normal address increments which occur in response to the clock pulses from AND gate 32. Similarly, when the coefficient counter becomes decremented to its lower limit, advance/hold control circuit 52 prevents read address generator from being incremented for a period of one clock pulse. This effectively resets the advance/hold control circuit 52.

In an analogous manner, the offsets and scan differences of the red, green and blue pickup devices of a color video camera can be compensated by utilizing the previously described technique of apparent signal delay by sample interpolation. A ROM may be programmed during assembly of the camera which will provide the appropriate correction amounts for each horizontal scan line.

The previously described sample interpolation technique therefore provides apparent delays of digitized video signals of small increments in order to correct misconvergence and raster distortion errors to within very small tolerances, thereby making the arrangement described in accordance with the present invention appropriate for high resolution cathode ray tubes.

What is claimed is:

1. In a video apparatus for displaying an image representative of a digitally encoded video information signal, means for spatially shifting said image comprising:
   means for selecting first and second ones of a plurality of digital input samples from said digitally encoded video information signal, said digital input samples having encoded amplitude values from a plurality of possible values;
   means for combining said first and second digital input samples to form a third sample having an apparent spatial displacement with respect to said first and second digital input samples resulting in an apparent shift in the location of the portion of said image corresponding to said first and second digital input samples, said means for combining said first and second digital input samples including means responsive to an image shift information signal representative of a desired location shift of said image for determining the manner in which said first and second digital input samples are combined to obtain said third sample that results in said desired location shift of said image.

2. The arrangement defined in claim 1, wherein said means for determining the manner in which said first and second digital input samples are combined comprises means responsive to said image shift information signal for generating first and second fractional sample coefficients and means for processing said first and second digital input samples in response to said first and second fractional sample coefficients, respectively, in order to form said third sample.

3. The arrangement defined in claim 2, wherein the summation of said first and second fractional sample coefficients forms a units fractional complement.

4. The arrangement defined in claim 2, wherein said means for processing said first and second digital input samples comprises means for providing amplitude weighting of said first and second digital input samples with said first and second fractional sample coefficients, respectively.

5. The arrangement defined in claim 1, wherein said digitally encoded video signal comprises a horizontal line of video information.

6. In a video apparatus including a cathode ray tube incorporating means for generating an electron beam in response to a digitally encoded component video information signal and incorporating a phosphor display screen which generates a light output when impinged by said electron beam, means for correcting the beam landing position of said electron beam on said phosphor display screen comprising:

means for selecting at least two samples from a first digitally encoded component video information signal;

means for providing a signal indicative of the landing error of said electron beam on said phosphor display screen;

means for generating a plurality of sample amplitude modifying coefficients having values determined in response to said electron beam landing error signal;

means for applying said amplitude modifying coefficients to said selected samples to provide a plurality of amplitude modified samples; and means for combining said amplitude modified samples to form said digitally encoded component video information signal comprising video information components having an apparent spatial displacement from the video information components of said first digitally encoded component video information signal, said apparent spatial displacement correcting said landing error of said electron beam.

7. In a video apparatus incorporating a cathode ray tube producing an electron beam that impinges on a display screen to form an image representative of a video information signal, said signal comprising a plurality of video information pixels, apparatus for correcting a predetermined amount of horizontal electron beam landing position error for said image on said display screen comprising:

means for providing a nominal amount of horizontal electron beam landing position error time delay for said plurality of video information pixels, representing a nominal amount of horizontal electron beam landing position error correction for said image;

means for providing in accordance with said predetermined amount of horizontal electron beam landing position error an additional amount of horizontal beam landing position error time delay for said plurality of delayed video information pixels equal to an integer number of pixel positions of time delay corresponding to an increase or decrease of time delay with respect to said nominal amount of time delay;

means for digitally selecting first and second ones of said plurality of video information pixels; and means for combining in accordance with said predetermined amount of horizontal electron beam landing position error said first and second ones of said plurality of video information pixels to provide an apparent amount of time delay for said plurality of video information pixels that represent fractional pixel positions of time delay corresponding to an increase or decrease of time delay with respect to said nominal amount of time delay for substantially providing correction for said predetermined amount of horizontal electron beam landing position error.

* * * * *